US008108920B2

(12) United States Patent
Spelman et al.

(10) Patent No.: US 8,108,920 B2
(45) Date of Patent: Jan. 31, 2012

(54) PASSIVE CLIENT SINGLE SIGN-ON FOR WEB APPLICATIONS

(75) Inventors: Jeffrey F. Spelman, Woodinville, WA (US); Yordan Rouskov, Kirkland, WA (US); Brendan W. Dixon, Sammamish, WA (US); Matthew Hur, Newcastle, WA (US); Josh Thomas Gray, Kirkland, WA (US); Michael S. Dusche, Sammamish, WA (US); Ryan D. Johnson, Redmond, WA (US); John Kahren Tevosyan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1187 days.

(21) Appl. No.: 10/436,880

(22) Filed: May 12, 2003

(65) Prior Publication Data

US 2004/0230831 A1 Nov. 18, 2004

(51) Int. Cl.
*G06F 7/04* (2006.01)

(52) U.S. Cl. .................... 726/8; 726/9; 726/20

(58) Field of Classification Search .................. 726/1, 2, 726/8–10; 713/150, 168, 175, 176; 380/255; 709/229, 223, 225

See application file for complete search history.

(56) References Cited

U.S. PATENT DOCUMENTS

| | | | |
|---|---|---|---|
| 5,768,503 A | | 6/1998 | Olkin et al. |
| 5,815,665 A | | 9/1998 | Teper et al. |
| 5,991,802 A | | 11/1999 | Allard et al. |
| 5,999,711 A | * | 12/1999 | Misra et al. ........................ 726/4 |
| 6,067,623 A | | 5/2000 | Blakley, III et al. |
| 6,088,451 A | * | 7/2000 | He et al. ............................ 726/8 |
| 6,141,758 A | | 10/2000 | Benantar et al. |
| 6,178,511 B1 | | 1/2001 | Cohen et al. |
| 6,195,682 B1 | | 2/2001 | Ho et al. |
| 6,219,651 B1 | | 4/2001 | Bublitz et al. |
| 6,240,512 B1 | | 5/2001 | Fang et al. |
| 6,243,816 B1 | | 6/2001 | Fang et al. |
| 6,275,944 B1 | | 8/2001 | Kao et al. |
| 6,339,423 B1 | * | 1/2002 | Sampson et al. ............... 715/854 |
| 6,339,827 B1 | | 1/2002 | Stokes et al. |
| 6,351,819 B1 | | 2/2002 | Berglund et al. |
| 6,370,561 B1 | | 4/2002 | Allard et al. |
| 6,374,283 B1 | | 4/2002 | Chessell et al. |
| 6,453,362 B1 | | 9/2002 | Bittinger et al. |
| 6,609,198 B1 | * | 8/2003 | Wood et al. .................... 713/155 |
| 6,687,831 B1 | | 2/2004 | Albaugh et al. |
| 6,959,336 B2 | * | 10/2005 | Moreh et al. .................... 709/229 |
| 6,993,596 B2 | * | 1/2006 | Hinton et al. .................. 709/250 |
| 7,010,582 B1 | * | 3/2006 | Cheng et al. ................... 709/219 |
| 7,010,600 B1 | * | 3/2006 | Prasad et al. ................... 709/225 |
| 7,194,764 B2 | * | 3/2007 | Martherus et al. ................. 726/8 |

(Continued)

OTHER PUBLICATIONS www.oasis-open.org/committees/tc_home.php?wg_abbrev=security; May 7, 2003; 4 pages.

(Continued)

*Primary Examiner* — Nirav B. Patel
(74) *Attorney, Agent, or Firm* — Lee & Hayes, PLLC (57) ABSTRACT

A system provides single sign-on capabilities for accessing a Web application through a passive client across multiple realms within a federation. A federation refers to different organizations or realms that have employed agreements, standards, and/or cooperative technologies to make user identity and entitlements portable between the organizations. Communications are redirected through a client in one realm to obtain a security token that can allow the resource server in the other realm to authenticate the user for access to the Web application.

28 Claims, 4 Drawing Sheets

U.S. PATENT DOCUMENTS

| | | | |
|---|---|---|---|
| 2002/0049912 A1* | 4/2002 | Honjo et al. | 713/201 |
| 2002/0091745 A1* | 7/2002 | Ramamurthy et al. | 709/100 |
| 2002/0144108 A1 | 10/2002 | Benantar | |
| 2002/0144119 A1 | 10/2002 | Benantar | |
| 2002/0194508 A1 | 12/2002 | Sanchez et al. | |
| 2003/0023880 A1* | 1/2003 | Edwards et al. | 713/201 |
| 2003/0037131 A1* | 2/2003 | Verma | 709/223 |
| 2003/0115267 A1* | 6/2003 | Hinton et al. | 709/204 |
| 2003/0163733 A1* | 8/2003 | Barriga-Caceres et al. | 713/201 |
| 2003/0177388 A1 | 9/2003 | Botz et al. | |
| 2003/0221126 A1 | 11/2003 | Berman et al. | |
| 2003/0233543 A1 | 12/2003 | Nagaratnam | |
| 2003/0236975 A1 | 12/2003 | Birk | |
| 2004/0002878 A1* | 1/2004 | Hinton | 705/7 |
| 2004/0128392 A1* | 7/2004 | Blakley et al. | 709/229 |

OTHER PUBLICATIONS www.projectliberty.org/specs/main.html; May 7, 2003; 3 pages.

Tivoli Secure Way Global Sign-On; Information Systems Management Canada Corporation, IBM Global Services; 2 pages; Canada.

ETrust Single Sign-On, Mangeing User Access in an eBusiness Environment; Computer Associates; 2000; 11 pages; Islandia, NY.

Using Tivoli SecureWay to Mange e-Business Security; www.cio.com/sponsors/060100_tivoli.html; May 6, 2003; 9 pages.

De Clercq, Jan; Single Sign-On Architectures; www.esat.kuleuven.ac.be/cosic/seminars/slides/sso.pdf; 2000; 30 pages.

* cited by examiner

PASSIVE CLIENT SINGLE SIGN-ON FOR WEB APPLICATIONS

TECHNICAL FIELD

The invention relates generally to communication networks, and more particularly to passive client single sign-on for Web applications.

BACKGROUND

The Web programming model makes it possible to build and deploy Web applications incrementally and in a decentralized manner. The Web programming model is considered "loosely coupled" and provides Web applications having a high degree of interoperability, scalability, and manageability. Generally, Web applications operate with at least a passive client that understands both HTTP and HTML, such as a Web browser. Examples of Web applications include e-commerce web sites such as www.microsoft.com and www.amazon.com.

In contrast, Web services adapt the loosely coupled Web programming model for use in services that do not require a visual UI ("user interface") (e.g., do not require a browser). Web services typically incorporate some combination of programming, data and (possibly) human resources to provide services made available from an organization's Web server to other Web-connected programs. Exemplary Web services may include major services, such as storage management and customer relationship management (CRM), down to much more limited services, such as online stock quotations and online bidding for an auction item.

Some features of a Web application are openly available to any user visiting a Web site. For example, the Amazon web site provides a catalog-type feature without strict authentication and authorization mechanisms. However, other features of a Web application may require that a user be authenticated before receiving access. For example, the Amazon web site requires authentication before a user is able to check the status of an order or to change payment information. Likewise, accessing a user's online email account provided by a Web email application requires logon information to authenticate the user.

Many users typically employ Web applications through many different sites. In many circumstances, each individual Web application requires the user to individually authenticate before access to a secure Web application feature is granted. For most Web applications, such authentication is performed via a custom authentication protocol based on posting a user's name and password for each Web application accessed.

In other circumstances, multiple Web applications provided by an individual organization (e.g., multiple Web sites provided by Amazon) may share authentication information, policies, and protocols to provide a Single Sign-On (SSO) or Single Sign-In (SSI) facility throughout that organization. As such, a user need only login once in a single session to one Web application of a given organization, and the user can be automatically or transparently authenticated for access to any other Web application provided by that organization.

However, when a user wishes to employ Web applications from multiple, independent organizations, individual logins are typically still required for each organization, a limitation which detracts from the desired convenience and seamless access potentially expected of Web applications. This is particularly true when the user is accessing a Web application in another organization through a passive client device, such as a client computer running a browser.

SUMMARY

Implementations described and claimed herein address the foregoing problems by providing a system supporting single sign-on capabilities for accessing a Web application through a passive client across different realms within a federation. A federation refers to different organizations (e.g., different autonomous identity domains or realms) that have employed agreements, standards, and/or cooperative technologies to make user identity and entitlements portable between the organizations. In this manner, a user of one realm can access a Web application of a different realm without multiple logon events.

In some implementations, articles of manufacture are provided as computer program products. One implementation of a computer program product provides a computer program storage medium readable by a computer system and encoding a computer program that authenticates a user. Another implementation of a computer program product may be provided in a computer data signal embodied in a carrier wave by a computing system and encoding the computer program that authenticates a user.

The computer program product encodes a computer program for executing on a computer system a computer process for authenticating a user. A resource challenge is received from a resource server of a resource realm through a Web-based client of an account realm. The resource challenge is generated responsive to a request for access to a Web application provided by the resource server. The resource realm and the account realm share a trust policy in a federation. A security token service challenge is sent to an account security token service module of the account realm through the Web-based client, responsive to receiving the resource challenge. An account security token received from the account security token service module through the Web-based client is verified, responsive to the sending of the security token service challenge. The account security token is formatted in accordance with the trust policy in the federation. A resource security token generated by the resource security token service module through the Web-based client is sent to the resource server to authenticate the user for access to the Web application, responsive to verifying the account security token.

In another implementation, a method of authenticating a user is provided. A resource challenge is received from a resource server of a resource realm through a Web-based client of an account realm. The resource challenge is generated responsive to a request for access to a Web application provided by the resource server. The resource realm and the account realm share a trust policy in a federation. A security token service challenge is sent to an account security token service module of the account realm through the Web-based client, responsive to receiving the resource challenge. An account security token received from the account security token service module through the Web-based client is verified, responsive to the sending of the security token service challenge. The account security token is formatted in accordance with the trust policy in the federation. A resource security token generated by the resource security token service module through the Web-based client is sent to the resource server to authenticate the user for access to the Web application, responsive to verifying the account security token.

In yet another implementation, a system for authenticating a user is provided. A Web-based client in an account realm generates a request for access to a Web application provided by a resource server of a resource realm, wherein the account realm and the resource realm share a trust policy in a federation. The resource server sends a resource challenge through the Web-based client to a resource security token service module of the resource realm. The resource challenge is generated by the resource server responsive to the request. The request is received through the Web-based client from a user of the account realm. The resource security token service module generates a security token service challenge, responsive to receipt of the resource challenge. An account security token service module of the account realm receives the security token service challenge from the resource security token service through the Web-based client and generates an account security token in accordance with the trust policy in the federation. The resource security token service module verifies the account security token received from the account security token service of the account realm through the Web-based client and generates a resource security token. The resource server verifies the resource security token generated by the resource security token service module to authenticate the user for access to the Web application.

Other implementations are also described and recited herein.

DETAILED DESCRIPTION

Single sign-on capabilities for accessing a Web application through a passive client across multiple realms within a federation are described.

Figure 1:
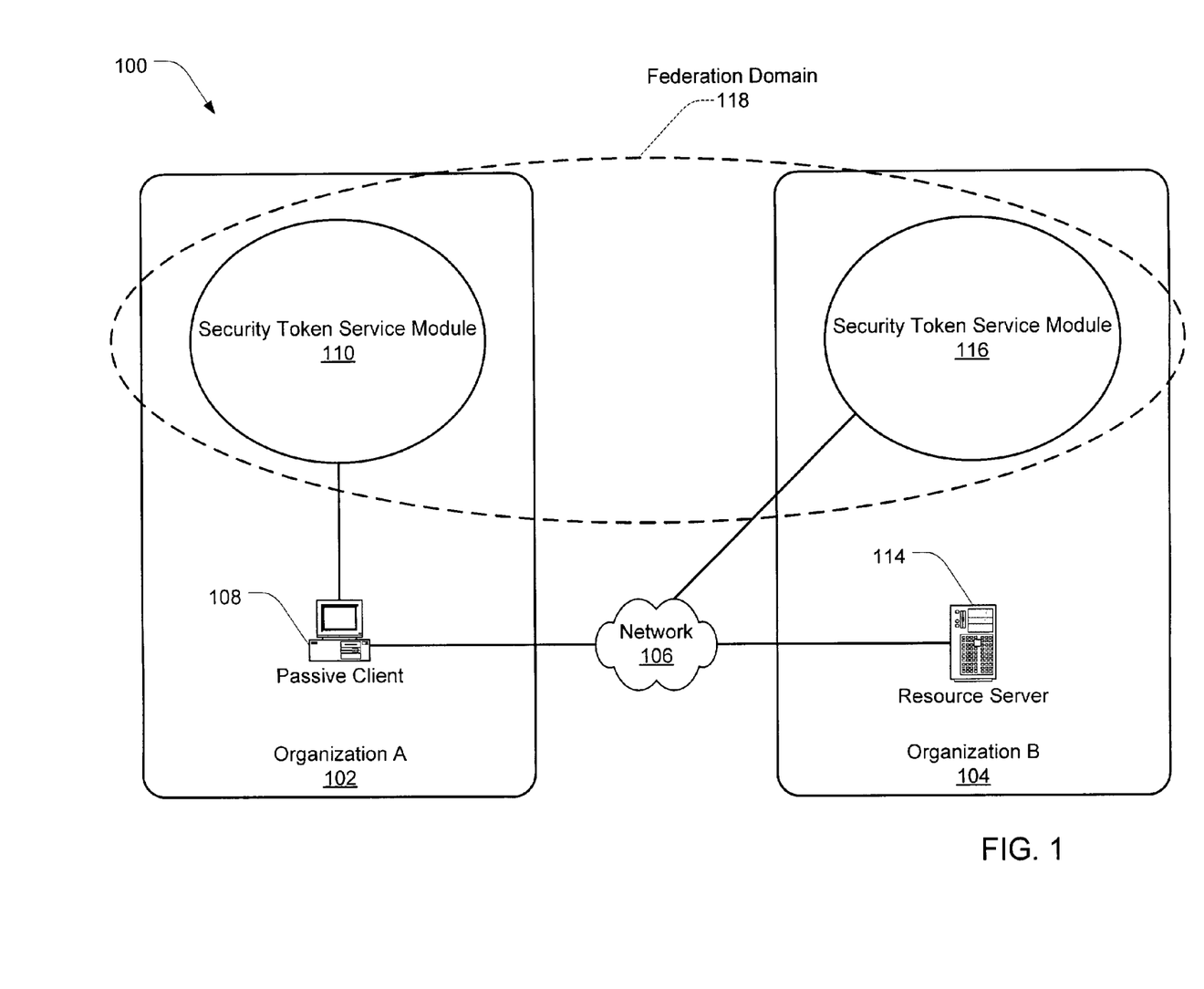
FIG. 1 represents a federation including two organizations coupled by a network in one embodiment.

FIG. 1 represents an exemplary federation 100 including an organization A 102 and an organization B 104 coupled by a network 106. The organization A 102 includes a passive client 108 and a security token service (STS) module 110 for the organization A 102. The passive client 108 may execute a web browser or another application that communicates through HTTP (HyperText Transfer Protocol). Generally, a passive client does not directly use the Web service security infrastructure—it does not send and receive Web service messages (such as messages complying with SOAP (Simple Object Access Protocol) or the GXA (Global XML Architecture) protocol). In contrast, active clients do send and receive Web service messages. It should be understood, however, that even some active clients could employ the implementations described herein. Communications of the passive client 108 can be accomplished, for example, through an HTML (HyperText Markup Language) user interface and POST forms, although other means including ECMAScript may also be used.

It should also be understood that at least in one implementation, a mechanism for carrying GXA formatted messages (such as security tokens defined in WS-Security and RST and RSTR messages defined in WS-Trust) is provided. Thus, Web applications can utilize the same security infrastructure as Web services. Alternatively, applications that use passive clients can use the same security infrastructure as applications that use active/rich clients.

The STS module 110 is associated with the account (e.g., a subscription account within organization A 102) of the user that is attempting to connect to the Web application provided by organization B 104. Generally, an STS is authoritative for a principal. The user claims to be that principal by supplying sufficient information (e.g., their valid login identifier and password). Therefore, when the user at the client 108 logs into an account in organization A through the STS module 110, the user at the client 108 become trusted by the STS module 110, and the STS module 110 becomes authoritative for the user.

It should be understood that the user at client 108 and STS module 110 are considered to exist logically within the organization A 102 but may be physically located anywhere. For example, the client 108 can actually be off-site or otherwise physically "outside" the organization A 102. However, by logically existing within the organization A 102, a user can log in to the organization A 102 or otherwise establish a trust relationship with the STS module 110 of the organization A 102.

The organization B 104 includes a resource server 114 and a security token service module 116 for the organization B 104. The resource server 114 provides access to at least one Web application. Generally, a Web application provides functionality over the Web, usually in a data language, such as HTML, or other objects, such as Macromedia Flash objects with functionality that can replace the functionality of the HTML pages (e.g., managing a logon event). Web applications typically communicate via the asynchronous HTTP over a TCP (Transmission Control Protocol) port, commonly port 80. It should be understood that the resource server 114 and STS module 116 are considered to exist logically within the organization B 104 but may be physically located anywhere.

The organization A 102 and the organization B 104 have formed a federation through agreements, standards, and/or cooperative technologies to make user identity and entitlements portable between the organizations. This federation relationship is illustrated by the federation domain 118 defined between the organization A 102 and the organization B 104. As a result, the organization A 102 and the organizational B 104 share a trust policy and support an agreed upon authentication token format for single sign-on sessions within the federation.

As an example of a single sign-on, a user associated with the organization A 102, such as a subscriber to one organization called "Foo Network", wishes to access a Web application (e.g., a Web-based email application) provided by the organization B 104, such as another organization called "Bar Network". However, without a federation domain defined between the organizations A and B, the user would not have access to the Web application provided by the organization B 104 unless the user is first authenticated through an independent logon process by the organization B 104.

The organizations are often termed "realms" in the federation context. An entity may be a member of a realm by sharing a symmetric key with the STS of that realm or trusting signatures created with the STS private key of that realm. A trust policy is established between two realms in a federation to enable the sharing of keys or the trusting of each other's signatures.

Figure 2:
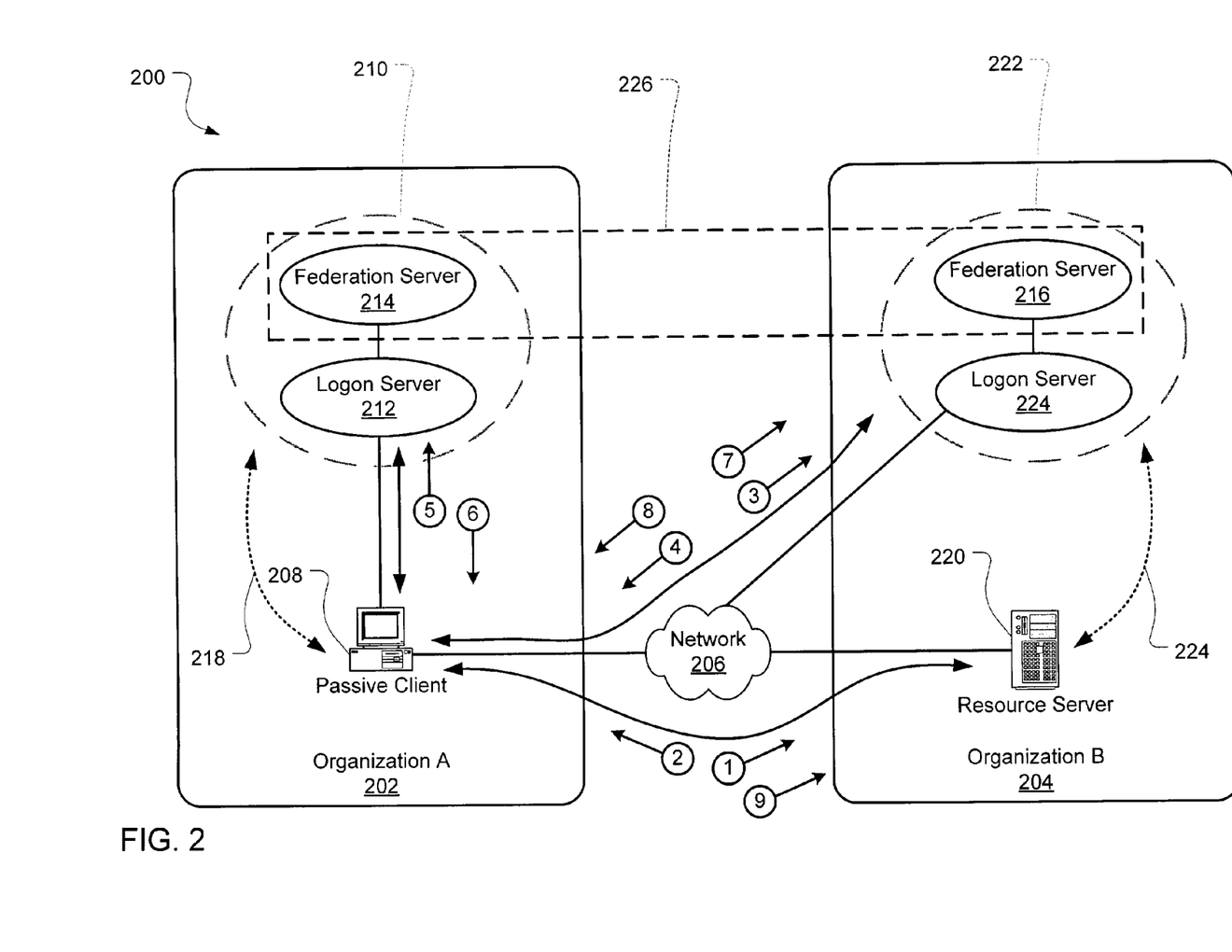
FIG. 2 represents another federation including two organizations coupled by a network in one embodiment.

FIG. 2 represents an exemplary federation 200 including an organization A 202 and an organization B 204 coupled by a network 206. The organization A 202 includes a passive client 208 and a security token service module 210, which includes a federation server 214 and a logon server 212. The federation server 214 is responsible for the aspects of authentication relating to the federation domain. One federation server may support multiple security token types. The federation server 214 corresponds to a counterpart federation server 216 in organization B 204. The federation servers 214 and 216 support a common authentication token format and share a trust policy relating to identity and entitlements supported between the organizations in the federation. It should also be understood that a federation server and a logon server may be the same entity or their functionality may be split.

The STS module 210 is associated with the account of the user that is attempting to connect to the Web application provided by organization B 204. In addition, the passive client 208 and the STS module 210 operate under an authentication policy 218. It should be understood that the client 208 and STS module 210 are logically within the organization A 202 but may be physically located anywhere.

The organization B 204 includes a resource server 220 and the STS module 222 for the organization B 204. The resource server 220 provides at least one Web application. The STS module 222 includes the federation server 216 and a logon server 224. The federation server 216 is responsible for the aspects of authentication relating to the federation domain. In addition, the resource server 218 and the STS module 222 operate under an authentication policy 224. A trust policy of federation domain 226 indicates adherence to agreements, standards, and/or cooperative technologies to make user identity and entitlements portable between the organizations.

In one implementation, the user requests access to the resource server 220 (e.g., to obtain access to a secured Web application provided by the resource server) through the passive client 208, as shown by HTML message #1 (all HTML messages are denoted by the circle and the arrow marked with a number in FIG. 2). However, the resource server 220 does not allow access by the user until the user has been authenticated by STS module 222. Therefore, with message #2, the resource server 220 sends a resource challenge to the logon server 224 in the STS module 222 through the passive client 208. The logon server 224 receives the resource challenge in message #3 and passes the resource challenge to the federation server 216 of STS module 222. The federation server 216 responds with an STS challenge as message #4 to the passive client 208, which sends the STS challenge as message #5 to the logon server 212 of STS module 210 in the organization A 202. The content of the STS challenge may be dictated or influenced by the federation agreements.

The logon server 212 passes the STS challenge to the federation server 214, which determines the authentication state of the user in accordance with the policy established in the organization A and the cross realm policies of the federation. The user may already be logged into the organization A 202 or may be required to log into the organization A 202 via an interface provided through the logon server 212. Alternatively, the user may log into the home realm through other logon means. In accordance with the federation policies, the federation server 214 creates an account security token in response to the STS challenge and sends it to the passive client 208 as message #6. The passive client 208 then sends the account security token to the STS module 222 as message #7.

The federation server 216 receives the account security token and filters and/or transforms the security token to produce a resource security token, as a response to the earlier resource challenge, in accordance with policies established between the resource server 220 and the STS module 222 and the cross realm trust policies of the federation. In this manner, the STS module 222 can determine the authentication state of the user relative to the organization B 204, based on the authentication represented by the account security token created by the STS module 210. The resource security token is sent to the passive client 208 as message #8 and forwarded to the resource server 220 as message #9. Access to the resource server 220 (and therefore the Web application) by the user through passive client 208 is granted in accordance with the received resource security token.

The message flow described above is merely exemplary. Other message flows are also contemplated. For example, the client of organization A, responsive to a detected configuration state, may obtain security token before attempting to access the target Web application in organization B.

Regarding authentication policies, a policy URI references the authentication preferences for the authentication requester, such as the target application. Exemplary policy values may include the requested security token type, security token lifetime, identity properties request, required authentication strength (e.g., request login with biometric device), etc. Policies may be used in accordance with the following rules:

Each STS defines schema details for the policies it supports (e.g., trust specific property definitions).

Each resource specifies policy URIs it is willing to accept when joining a realm.

If a realm participates in a relationship with another realm (e.g., a federation), the realms share a trust policy.

A policy defines a preference. The recipient of a security token verifies that the token's contents reflect the applicable policy.

An exemplary policy for a realm is shown:

```
<authPolicy>
    <forceSignin>true</ForceSignin>
    <timeToLive>60</TimeToLive>
    <tokenType>SAML</TokenType>
</AuthPolicy>
```

An exemplary policy schema is also shown:

```
<?xml version="1.0" encoding="utf-8" ?>
<xs:schema targetNamespace=
    http://schemas.microsoft.com/Passport/PolicySchema
    elementFormDefault="qualified"
    xmlns="http://schemas.microsoft.com/Passport/PolicySchema"
    xmlns:xs="http://www.w3.org/2001/XMLSchema"
    xmlns:wsse="http://schemas.xmlsoap.org/ws/2002/02/secext">
    <xs:complexType name="AuthPolicy">
        <xs:sequence>
            <xs:element name="noUI" type="NoUI" minOccurs="0"/>
            <xs:element name="forceSignin" type="ForceSignin"
                minOccurs="0"/>
            <xs:element name="timeToLive" type="TimeToLive"
                minOccurs="0"/>
            <xs:element name="tokenType" type="TokenType"
                minOccurs="0"/>
            <xs:element name="targetKeyType" type=
                "TargetKeyType"
                minOccurs="0"/>
            <xs:element name="requestedAuthType"
                type="RequestedAuthType" minOccurs="0"/>
        </xs:sequence>
    </xs:complexType>
    <xs:simpleType name="NoUI">
        <xs:annotation>
            <xs:documentation>
                Specifies whether or not STS UI should be displayed if user
```

-continued

```
is not authenticated
            </xs:documentation>
        </xs:annotation>
        <xs:restriction base="xs:boolean" />
    </xs:simpleType>
    <xs:simpleType name="ForceSignin">
        <xs:annotation>
            <xs:documentation>
                Boolean specifying whether to renew ticket
automatically or ask for credentials
            </xs:documentation>
        </xs:annotation>
        <xs:restriction base="xs:boolean" />
    </xs:simpleType>
    <xs:simpleType name="TimeToLive">
        <xs:annotation>
            <xs:documentation>
                This policy value defines requested lifetime of the
token
            </xs:documentation>
        </xs:annotation>
        <xs:restriction base="xs:decimal" />
    </xs:simpleType>
    <xs:simpleType name="TokenType">
        <xs:annotation>
            <xs:documentation>
                Token type requested by the partner site.
                These are for now Saml assertions or passport tickets
            </xs:documentation>
        </xs:annotation>
        <xs:restriction base="xs:string">
            <xs:enumeration value="SAML" />
            <xs:enumeration value="Passport" />
        </xs:restriction>
    </xs:simpleType>
    <xs:simpleType name="TargetKeyType">
        <xs:annotation>
            <xs:documentation>
                what key to use to encrypt Partner's token. See wsse
for key types.
                The usage is different than RequestKeyType in RST.
            </xs:documentation>
        </xs:annotation>
        <xs:restriction base="xs:string"/>
    </xs:simpleType>
    <xs:simpleType name="RequestedAuthType">
        <xs:annotation>
            <xs:documentation>
                Authentication type requested. Optional.
                Allowed types are password auth, client cert and
                password + PIN
            </xs:documentation>
        </xs:annotation>
        <xs:restriction base="xs:anyURI">
            <xs:enumeration value="urn:passport:names:password" />
            <xs:enumeration value="urn:ietf:rfc:2246" />
            <xs:enumeration value="urn:passport:names:passwordpin"
            />
        </xs:restriction>
    </xs:simpleType>
<xs:element name="authPolicy" type="AuthPolicy"/>
</xs:schema>
```

Figure 3:
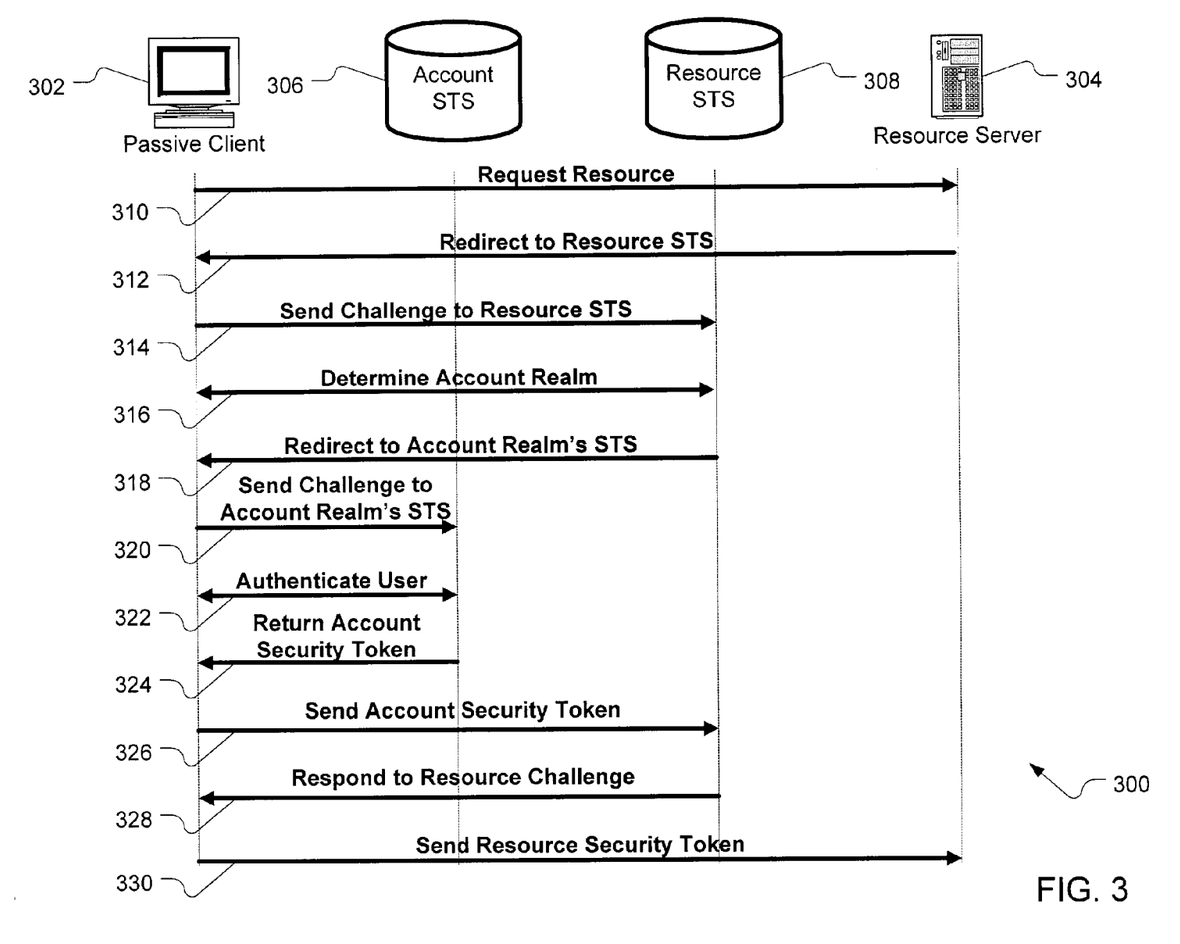
FIG. 3 represents communications among federation entities in a single sign-on session of between a passive client and a Web resource in one embodiment.

FIG. 3 represents exemplary communications 300 among federation entities in a single sign-on session of between a passive client 302 and a resource server 304. The account STS 306 and passive client 302 are associated with organization A, to which the user is a member (e.g., a subscriber). The resource STS module 308 is associated with organization B, which is capable of providing the desired Web application through the resource server 304. For this description, it is assumed that the user has not already been authenticated by the resource STS module 308 and is not directly a member of the organization B.

A resource request 310 is sent by the passive client 302 to the resource server 304 requesting access to a Web application. In one implementation, the request is in the form of an HTTP Get, although other request formats are contemplated.

Not having appropriate authentication information for the user to grant access to the Web application, the resource server 304 uses message 312 to redirect a resource challenge through the passive client 302 to the resource STS module 308 for authentication. In one implementation, the redirection is sent as an HTTP redirect as follows:

302 Found
Location: <Resource STS URL>?<QS parameters> where <Resource STS URL> identifies the location of the resource STS module 308 in the organization B and <QS parameters> may include:

| | |
|---|---|
| Wa | Indicating the requested action, WREQ, or login request for the resource. |
| wru | Indicating the return URL (Uniform Resource Locator), which is where the resource STS sends the security token or error information. The return URL is in the resource DNS domain. If omitted, a default URL for the resource is used. |
| wp | Indicating the policy URI (Uniform Resource Identifier) that identifies the policy to be used for authentication in the organization B. |
| wct | Indicating the current time at the resource server when it challenges for authentication (e.g., in the canonical representation of dateTime from [XML-Schema2]). |

In an alternative implementation, the resource challenge may be performed using a POST through the client browser. An exemplary POST is shown below:

```
<form action=<Resource STS URL>>
    <input type=hidden name="wa" value="WREQv1.0">
    <input type=hidden name="wru" value=<return URL>>
    <input type=hidden name="wp" value=<policy URI>>
    <input type=hidden name="wct" value=<current time>>
</form>
```

In one implementation, secure HTTPs URLs are used to identify STS modules. The passive client 302 sends the resource challenge to the resource STS module 308 in message 314. The resource STS module 308 determines if the user is already authenticated within organization B. The authentication state of the user within organization B may be preserved in a cookie of a format selected by the resource STS module 308. If the user is already authenticated, the resource STS module 308 creates a resource security token, which is passed in response to the resource challenge back to the resource server 304 through the passive client 302 (see messages 328 and 330).

If the user is not already authenticated within organization B, the resource STS module 308 determines the realm in which the user is a member through interaction 316. In one implementation, the resource STS module 308 determines the user's realm through a user interface. Alternatively, the user's realm may be recorded in a cookie from some earlier exchange or the resource STS module redirects the client to a predefined STS, etc. If the user is also a member of organization B's realm (such that the resource STS module 308 and the account STS module 306 are the same entity), the user's credentials are collected from the resource STS module 308 in a manner similar to that described with regard to interaction 322. Thereafter, the resource STS module 308 creates a resource security token based upon these credentials and, in response to the earlier resource challenge from the resource server 304, sends the resource security token back to the resource server 304 through the passive client 302 (see messages 328 and 330).

If the user is not a member of organization B's realm, the resource STS module 308 uses message 318 to redirect an STS challenge through the passive client 302 to the account STS module 306 for the account's realm (i.e., organization A) for authentication. In one implementation, the redirection is sent as an HTTP redirect as follows:

302 Found

Location: <Account STS URL>?<QS parameters> where <Account STS URL> identifies the location of the account STS module 306 in the organization A and <QS parameters> may include:

| | |
|---|---|
| wa | Indicating the requested action, LREQ, or login request for the resource. In this case, the request is for a client login to a foreign realm. |
| wrr | Indicating the name of the resource realm (i.e., the realm of the entity that is requesting the login). |
| Wri | Indicating the resource information that is to be returned to the resource STS. This parameter is a pass-through parameter that is returned in the response and is not processed by the account STS. |
| Wtp | Identifying the trust policy URI. Indicates preferences for the token to be issued to the resource STS. |
| Wct | Indicating the current time at the resource server when it challenges for authentication (e.g., in the canonical representation of dateTime from [XML-Schema2]). |

In an alternative implementation, the STS challenge may be performed using a POST through the client browser. An exemplary POST is shown below:

```
<form action=<resource STS URL>>
    <input type=hidden name="wa" value="LREQv1.0">
    <input type=hidden name="wrr" value=<resource realm>>
    <input type=hidden name="wri" value=<resource information>>
    <input type=hidden name="wtp" value=<policy URI>>
    <input type=hidden name="wct" value=<current time>>
</form>
```

The passive client 302 sends the STS challenge to the account realm's account STS module 306 in message 320. The account STS module 306 determines if the user is already authenticated within organization A. The authentication state of the user within organization A may be indicated by a cookie set in the account STS DNS domain. If the user is already authenticated, the account STS module 308 creates an account security token, which is passed in response to the STS challenge back to the resource STS module 308 through the passive client 302 (see messages 324 and 326).

If the user is not already authenticated by the account STS module 306, the logon server of the account STS module 306 authenticates the user in interaction 322, such as through a login user interface requesting a login identifier and a password. In some implementations, the login user interface is shown through a SSL (Secure Sockets Layer) connection. Upon collection and verification of these user credentials, the account STS module 306 creates an account security token.

The account security token is returned to the resource STS module 308 through the passive client 302 in messages 324 and 326. In one implementation, the account security token is posted through the client browser using a POST form containing the following information:

```
<form action=<resource STS URL>>
    <input type=hidden name="wtoken" value=<account security token >>
    <input type=hidden name="wrri" value=<resource information>>
</form>
```

The POST may be automated via a client-side intermediate language script. The account security token may be, for example, a base64 encoded XML document. The <resource information> includes the "wri" parameter in the query string of the STS challenge. The account STS module 306 may also set a cookie to indicate the user's logged-in state.

A security token may take many forms, although returned security tokens are encrypted. An exemplary format for a security token is shown below using a recipient's public key to encrypt the security token:

```
<wsse:Security>
    <!-- encrypted token for the message -->
    <EncryptedData Id="Token"
        xmlns="http://www.w3.org/2001/04/xmlenc#"
        Type="http://www.w3.org/2001/04/xmlenc#Element">
        <!-- encryption key is AES -->
<EncryptionMethod Algorithm="http://www.w3.org/2001/04/
xmlenc#aes256-cbc"/>
        <ds:KeyInfo xmlns:ds='http://www.w3.org/2000/09/xmldsig#>
            <!-- the key is provided encrypted -->
            <EncryptedKey ID="EK">
                <EncryptionMethod
    Algorithm="http://www.w3.org/2001/04/xmlenc#rsa-oaep-mgf1p"/>
                <ds:KeyInfo>
                    <ds:X509Data>
                        <ds:X509SKI>123456...</ds:X509SKI>
                    </ds:X509Data>
                </ds:KeyInfo>
                <CipherData>
                    <CipherValue>
                        encryptedkeybase64encoded
                    </CipherValue>
                </CipherData>
            </EncryptedKey>
        </ds:KeyInfo>
        <CipherData>
            <CipherValue>EncryptedToken</CipherValue>
        </CipherData>
    </EncryptedData>
</wsse:Security>
```

In one implementation, the account security token is defined in the form of a SAML (Security Assertion Markup Language) assertion and a public key signature. SAML is an XML-based framework for ensuring that transmitted communications are secure and defines mechanisms to exchange authentication, authorization, and non-repudiation information. Exemplary security token data in the form of a SAML assertion and a public key signature is shown (after decryption):

```
<saml:Assertion MajorVersion="1" MinorVersion="0"
AssertionID="1234567890987654321-10-29-02" Issuer="Sample"
IssueInstant="2002-10-29T09:00:00-08:00" xsi:schemaLocation="
urn:oasis:names:tc:SAML:1.0:assertion file:///c:\InfoModel\SAML\
cs-sstc-schema-
assertion-01.xsd" xmlns:xsi="http://www.w3.org/2001/
XMLSchema-instance"
    xmlns:saml="urn:oasis:names:tc:SAML:1.0:assertion">
        <!-- validity interval for the token -->
```

-continued

```
<saml:Conditions NotBefore=xxxx NotOnOrAfter=xxxx>
    <!-- recipient name -->
    <saml:AudienceRestrictionCondition>
        <saml:Audience>resourcerealm.com</saml:Audience>
    </saml:AudienceRestrictionCondition>
</saml:Conditions>
<saml:AuthenticationStatement
    AuthenticationMethod=
    "urn:oasis:names:tc:SAML:1.0:am:password"
    AuthenticationInstant=xxx/>
<saml:AttributeStatement>
    <saml:Subject>
        <saml:SubjectConfirmation>
            <saml:ConfirmationMethod>
                urn:oasis:names:tc:SAML:1.0:cm:sender-vouches
            <\saml:ConfirmationMethod>
        </saml:SubjectConfirmation>
        <!-- this is the unique name for the client -->
        <saml:NameIdentifier Format="#emailAddress">
            user@accountrealm.com
        </saml:NameIdentifier>
    </saml:Subject>
    ...
</saml:AttributeStatement>
</saml:Assertion>
<ds:Signature xmlns:ds="http://www.w3.org/2000/09/xmldsig#">
    <ds:SignedInfo>
        <ds:CanonicalizationMethod
Algorithm="http://www.w3.org/TR/2001/REC-xml-c14n-
20010315"/>
        <ds:SignatureMethod
Algorithm="http://www.w3.org/2000/09/xmldsig#rsa-sha1"/>
        <ds:Reference URI="">
            <ds:Transforms>
                <ds:Transform
Algorithm="http://www.w3.org/TR/2001/REC-xpath-1999111">
                    <XPath>//saml:Assertion[1]</XPath>
                </ds:Transform>
                <ds:Transform
                    Algorithm="http://www.w3.org/TR/2001/
REC-xml-c14n-20010315"/>
            </ds:Transforms>
            <ds:DigestMethod
Algorithm="http://www.w3.org/2000/09/xmldsig#sha1"/>
            <ds:DigestValue>digest of transform</ds:DigestValue>
        </ds:Reference>
    </ds:SignedInfo>
    <ds:SignatureValue>
        encryptthehashwiththesigkey
    </SignatureValue>
    <ds:KeyInfo>
        <ds:X509Data>
            <ds:X509SKI>123456...</ds:X509SKI>
        </ds:X509Data>
    </KeyInfo>
</ds:Signature>
```

Other token formats may also be defined. Possible properties of security tokens are listed below:

Security tokens contain signature of the issuing authority over the whole token. This is the "signature" element over the SAML assertion above.

Security tokens contain a subject identifier uniquely identifying the entity for which the security token was granted. The SAML assertions used assure the identifiers issued are unique across the realms. The originating realm of a given security token is derivable from the subject identifier.

Security tokens contain a recipient identifier, such as the "Audience Restriction" element in the SAML assertion above.

Security tokens contain the time of initial authentication, validity interval, and the type of authentication that was performed. The validity of the SAML assertion is satisfied by the "NotBefore" and "NotOnOrAfter" Attributes of the "Conditions" element. The initial authentication type and time are covered by the attributes of the "AuthenticationStatement" element.

Security tokens contain identity information, provided schema describing the additional identify information is understood by the recipient.

Security tokens are sent over a secure connection and are encrypted with the recipient's public key known to the STS.

Upon receipt of message 326, the resource STS module 308 verifies the account security token. In one implementation, such verification involves verifying that the security token is formatted correctly, verifying the account STS module signature, verifying the security token validity interval, and verifying properties request by policy, such as a required authentication type, maximum time since authentication instance (e.g., a password must have been submitted within an hour), identity properties, etc.

If the account security token is verified successfully, the resource STS module 308 formats a resource security token for the resource server 304. The token is formatted based on the account security token (or account credentials if the account and resource are in the same realm). The resource security token is sent, in response to the earlier resource challenge, to the resource server 304 (in messages 328 and 330) via a POST substantially in the form:

```
<form action=<resource server URL>>
    <input type=hidden name="wt" value=<resource security token>>
</form>
``` where the <resource server URL> identifies the location of the resource server and, in one implementation, the <resource security token> includes a base64-encoded XML document. The resource STS module 308 may choose to set a cookie recording the logged-in state of the user and the account realm.

Upon receipt of message 330, the resource server 304 verifies that the resource security token is formatted correctly before granting the user with access to the requested Web application. The resource server 304 may also set a cookie indicating the logged-in state of the user in the resource server 304.

In the course of message exchange between entities in the network, cookies may have been set to record the user's authentication state. A logout process provides mechanism to delete the cookies for all visited resources and STS servers. One implementation of a logout process is performed in accordance with the following rules:

Each STS provides a logout URL.
Each resource provides a logout URL.
Each STS keeps track of resources for which it issues security tokens.
Each STS keeps track of trusting realms for which it has issued security tokens.
Each STS keeps track of trusted realms from which it has received security tokens.

A logout is initiated when an STS logout URL is accessed. In response, the authentication cookies for that STS are deleted and the logout URLs for all recorded visited resources, trusting realms, and trusting realms are accessed, causing deletion of authentication state cookies on those entities. By this protocol, the logout mechanism is extended to include federations.

An exemplary structure of a security token is shown below, although other structures are also contemplated. The structure represents a security token from a resource STS to a resource server when a symmetric key is shared between those two entities for authentication purposes.

```
<wsse:Security>
    <!-- encrypted token for the message -->
    <!-- encrypted for resource web server -->
    <EncryptedData Id="EncryptedWSToken"
            xmlns="http://www.w3.org/2001/04/xmlenc#"
            Type="http://www.w3.org/2001/04/xmlenc#Element">
        <EncryptionMethod
   Algorithm="http://www.w3.org/2001/04/xmlenc#aes256-cbc"/>
        <ds:KeyInfo>
            <!-- the key is derived from the shared key -->
            <wsse:DerivedKeyToken ID="" wsse:Algorithm="
http://www.w3.org/2000/09/xmldsig#hmac-sha1">
                <SecurityTokenReference>
                    <!-- refers to the key shared between STS-R and
                    WS-R -->
                    <Reference URI="#SharedKey"/>
                </SecurityTokenReference>
                <Properties>
                    <Label>FederationSTS-WSEncKey</Label>
                    <Nonce>321...</Nonce>
                </Properties>
                <Generation>1</Generation>
            </wsse:DerivedKeyToken>
        </ds:KeyInfo>
        <CipherData>
            <CipherValue>EncryptedWSToken</CipherValue>
        </CipherData>
    </EncryptedData>
</wsse:Security>
```

If there is no pre-negotiated shared key, the security token can be sent as an encrypted (with public key) key. Also if the security token travels over SSL connections in its entire path, the security token does not have to be (but still can be) encrypted at all. Encryption requirements can be set via policy. The basis of trust is the signature in the token.

Figure 4:
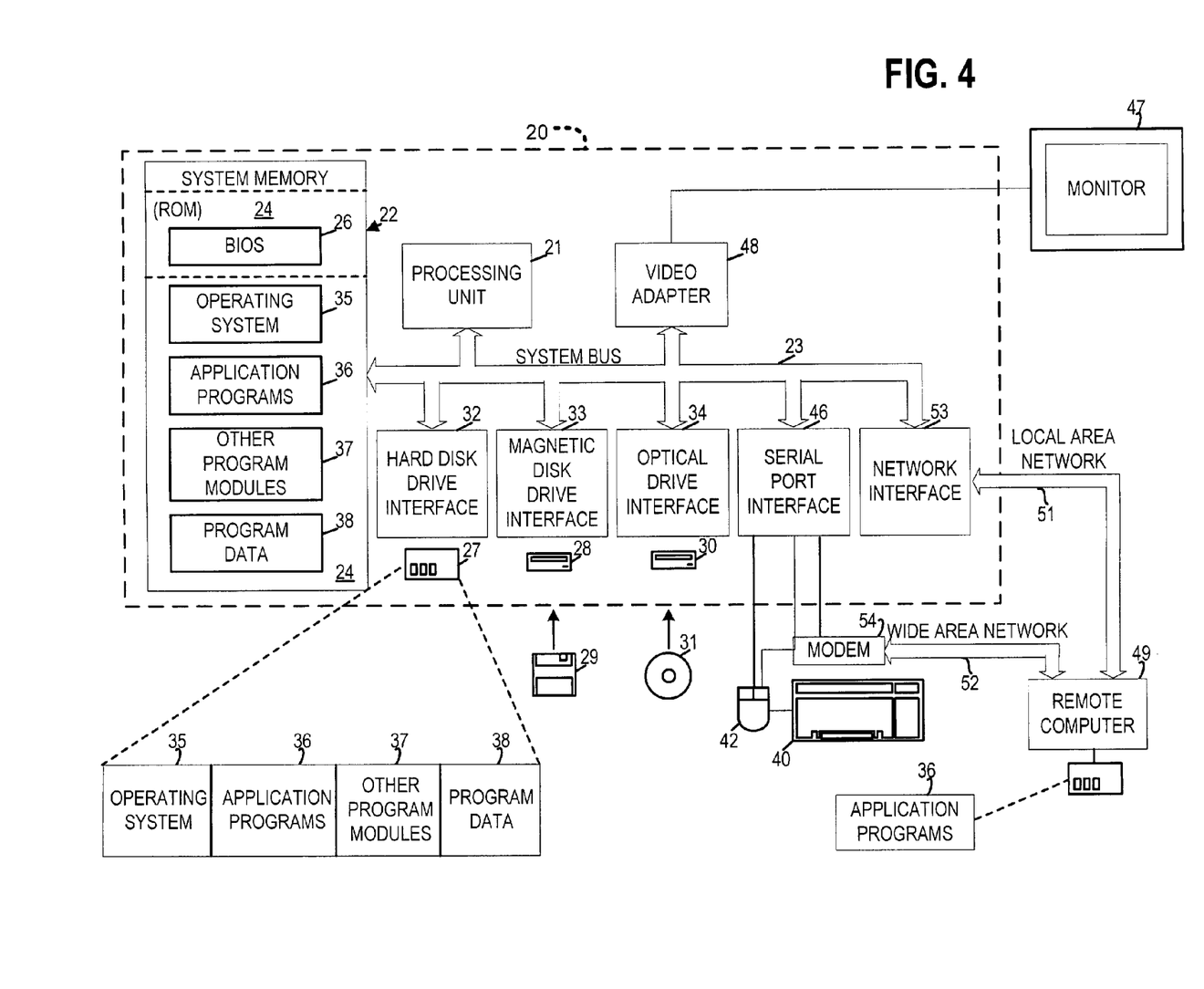
FIG. 4 illustrates a system useful for implementing an embodiment of the present invention.

The exemplary hardware and operating environment of FIG. 4 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is 11 also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, STS modules, resource servers, client modules, federation servers, logon servers and other modules may be incorporated as part of the operating system 35, application programs 36, or other program modules 37. Security tokens, trust policies, Web application descriptors, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
    under control of one or more processors configured with executable instructions:
    receiving at a resource security token service module of a resource realm, a resource challenge from a resource server of the resource realm through a Web-based client of an account realm, the resource challenge being generated by the resource server responsive to a request from a client of the account realm for access to a Web application provided by the resource server, and the resource realm sharing a trust policy in a federation with the account realm;
    responsive to receiving the resource challenge, sending by the resource security token service module, a security token service challenge through the Web-based client to an account security token service module of the account realm, the security token service challenge including parameters indicating a requested action, a name of the resource realm, resource information as a pass-through parameter, and a trust policy uniform resource identifier (URI) that identifies preferences for a token to be issued to the resource security token service;
    receiving by the resource security token service module, an account security token, the account security token being formatted in accordance with the trust policy in the federation;
    verifying whether a format of the account security token is correct by the resource security token service module;
    responsive to verifying that the format of the account security token is correct, generating by the resource security token service module, a resource security token, the resource security token;
    formatting the resource security token based on whether the resource realm and the account realm are the same, wherein
        the resource security token service module formats the resource security token based on account credentials of the client in response to determining that the resource realm and the account realm are the same; and
        the resource security token service module formats the resource security token based on the account security token in response to determining that the resource realm and the account realm are not the same;
    sending by the resource security token service module, the resource security token through the Web-based client to the resource server, the resource security token enabling the resource server to authenticate the client for access to the Web application.

2. The method of claim 1 wherein the security token service challenge has a format that is dependent upon the trust policy in the federation.

3. The method of claim 1 wherein content of the account security token is a base64 encoded XML document.

4. The method of claim 1 wherein content of the security token service challenge is dependent upon the trust policy in the federation.

5. The method of claim 1 wherein the resource challenge has a format that is dependent upon a trust policy in the resource realm.

6. The method of claim 1 wherein the resource security token has a format that is dependent upon a trust policy in the resource realm.

7. The method of claim 1 further comprising:
    determining a realm in which the client is a member, the realm representing the account realm.

8. The method of claim 1 further comprising:
    receiving the resource challenge from the resource server by a redirection through a passive client in the account realm.

9. The method of claim 1 further comprising:
    redirecting the security token service challenge to the account security token service module of the account realm through a passive client in the account realm.

10. The method of claim 1 further comprising:
    receiving the account security token from the account security token service module by a redirection through a passive client in the account realm.

11. The method of claim 1, wherein the security token service challenge is performed using a POST through the Web-based client, and the resource challenge POST includes parameters indicating:
    a return uniform resource locator (URL); and
    a policy uniform resource identifier (URI) that identifies a policy to be used for authentication.

12. A method comprising:
    under control of one or more processors configured with executable instructions:
    receiving a resource challenge from a resource server of a resource realm through a Web-based client of an account realm, the resource challenge being generated responsive to a request for access to a Web application provided by the resource server, and the resource realm and the account realm sharing a trust policy in a federation;
    sending a security token service challenge to an account security token service module of the account realm through the Web-based client, responsive to receiving the resource challenge, the security token service challenge including parameters indicating a requested action, a name of the resource realm, resource information as a pass-through parameter, and a trust policy uniform resource identifier (URI) that identifies preferences for a token to be issued to the resource security token service;
    verifying whether an account security token received from the account security token service module through the Web-based client is correctly formatted in accordance with the trust policy in the federation;
    responsive to verifying that the account security token is correctly formatted in accordance with the trust policy in the federation, generating by the resource security token service module, a resource security token;

formatting the resource security token based on whether the resource realm and the account realm are the same, wherein the resource security token service module formats the resource security token based on account credentials of the client in response to determining that the resource realm and the account realm are the same; and the resource security token service module formats the resource security token based on the account security token in response to determining that the resource realm and the account realm are not the same; and sending the resource security token generated by the resource security token service module through the Web-based client to the resource server, the resource security token enabling the resource server to authenticate the client for access to the Web application.

13. The method of claim 12 wherein the account security token has a format that is dependent upon the trust policy in the federation.

14. The method of claim 12 wherein the security token service challenge has a format that is dependent upon the trust policy in the federation.

15. The method of claim 12 wherein content of the account security token is dependent upon the trust policy in the federation.

16. The method of claim 12 wherein content of the security token service challenge is dependent upon the trust policy in the federation.

17. The method of claim 12 wherein the resource challenge has a format that is dependent upon a trust policy in the resource realm.

18. The method of claim 12 wherein the resource security token has a format that is dependent upon a trust policy in the resource realm.

19. The method of claim 12 wherein the computer process further comprises:

determining a realm in which the client is a member, the realm representing the account realm.

20. The method of claim 12 wherein the computer process further comprises:

receiving the resource challenge from the resource server by a redirection through a passive client in the account realm.

21. The method of claim 12 wherein the computer process further comprises:

redirecting the security token service challenge to the account security token service module of the account realm through a passive client in the account realm.

22. The method of claim 12 wherein the computer process further comprises:

receiving the account security token from the account security token service module by a redirection through a passive client in the account realm.

23. The method of claim 12, wherein the account security token contains a signature of an issuing authority.

24. The method of claim 12, wherein the account security token contains a subject identifier that uniquely identifies the account for which the account security token was granted.

25. The method of claim 12, wherein the account security token contains a recipient identifier.

26. The method of claim 12, wherein the account security token comprises:

a time of initial authentication;
a validity interval; and
a indication of type of authentication that was performed.

27. The method of claim 12, wherein the account security token is sent over a secure connection.

28. A system comprising:

a resource realm, the resource realm comprising:
a resource realm processor; and
a resource security token service module, executed by the resource realm processor, the resource security token service module sharing with a resource server hosting a Web application, a symmetric key or trusted signatures created with a resource security token private key;

wherein:

responsive to receiving a resource challenge from the resource server through a Web-based client of an account realm of a client which sends a request to access the Web application of the resource server, the resource security token service module is configured to generate a security token service challenge, and transmit the security token service challenge through the Web-based client to an account security token service module of the account realm, the account realm sharing a trust policy in a federation with the resource realm, and the security token service challenge including parameters indicating a requested action, a name of the resource realm, resource information as a pass-through parameter, and a trust policy uniform resource identifier (URI) that identifies preferences for a token to be issued to the resource security token service;

responsive to receiving an account security token from the account security token service module upon authenticating the client, the resource security token service module is further configured to:

verify the account security token by determining whether a format of the account security token is correctly formatted in accordance with the trust policy in the federation;

generate a resource security token responsive to determining that the format of the account security token is correctly formatted in accordance with the trust policy in the federation, the resource security token enabling the resource server to authenticate the user for access to the Web application;

format the resource security token based on whether the resource realm and the account realm are the same, wherein the resource security token service module formats the resource security token based on account credentials of the user in response to determining that the resource realm and the account realm are the same; and the resource security token service module formats the resource security token based on the account security token in response to determining that the resource realm and the account realm are not the same; and transmit the resource security token to the resource server, the resource security token enabling the resource server to authenticate the client for access to the Web application.

* * * * *